US007033240B2

(12) United States Patent
Weiser

(10) Patent No.: US 7,033,240 B2
(45) Date of Patent: Apr. 25, 2006

(54) SPRING NOVELTY WITH ROTATING APPENDAGE AND REMOVABLE SECURING PORTION

(75) Inventor: Margaret Weiser, Tarzana, CA (US)

(73) Assignee: Exhart environmental Systems, Inc., Chatsworth, CA (US)

( * ) Notice: Subject to any disclaimer, the term of this patent is extended or adjusted under 35 U.S.C. 154(b) by 0 days.

(21) Appl. No.: 10/971,285

(22) Filed: Oct. 25, 2004

(65) Prior Publication Data

US 2005/0054261 A1 Mar. 10, 2005

Related U.S. Application Data

(63) Continuation of application No. 10/457,919, filed on Jun. 9, 2003, now Pat. No. 6,843,702.

(51) Int. Cl.
*A63H 13/00* (2006.01)
*A63H 33/40* (2006.01)
*G09F 19/08* (2006.01)
*A01H 31/06* (2006.01)

(52) U.S. Cl. ........................ 446/199; 446/217; 40/417; 43/3

(58) Field of Classification Search ................ 446/374, 446/380, 384, 486, 490, 97, 236, 199, 217, 446/218, 35, 381; 43/2, 3; 40/411, 412, 40/417, 413, 415
See application file for complete search history.

(56) References Cited

U.S. PATENT DOCUMENTS

| | | | |
|---|---|---|---|
| 278,461 | A | 5/1883 | Screven |
| 1,538,562 | A | 5/1925 | Koshalko |
| D75,871 | S | 7/1928 | Reek |

(Continued)

(Continued)

*Primary Examiner*—Faye Francis
(74) *Attorney, Agent, or Firm*—Cislo & Thomas LLP

(57) ABSTRACT

A novelty which has a head and appendages coupled to a body via coupling elements, and includes one or more rotating members so as to add dynamic and aesthetic beauty to any garden, kitchen or other setting.

19 Claims, 3 Drawing Sheets

U.S. PATENT DOCUMENTS

| | | | |
|---|---|---|---|
| D75,908 | S | 7/1928 | Fridolph et al. |
| 1,814,314 | A | 7/1931 | Kane et al. |
| 1,940,490 | A | 12/1933 | Frazier |
| D142,968 | S | 11/1945 | Royals |
| D148,263 | S | 12/1947 | Wagner |
| 2,560,481 | A | 7/1951 | Rouse |
| 2,729,022 | A | 1/1956 | Polk |
| 2,760,303 | A | 8/1956 | Del Mas |
| 2,775,064 | A | 12/1956 | Otto |
| D185,075 | S | 5/1959 | Erenhouse |
| 3,220,253 | A | 11/1965 | Parker |
| 3,290,817 | A | 12/1966 | Kravath |
| D213,013 | S | 12/1968 | Klingberg |
| 3,452,473 | A | 7/1969 | Convertine |
| 4,031,656 | A | 6/1977 | Kupperman et al. |
| 4,863,413 | A | 9/1989 | Schwarz |
| 5,085,075 | A | 2/1992 | Baker |
| 5,375,363 | A | 12/1994 | Higdon |
| 5,551,923 | A | 9/1996 | Worzella |
| 5,613,317 | A | 3/1997 | Ninegar |
| D384,598 | S | 10/1997 | Park |
| D394,463 | S | 5/1998 | Filho |
| D402,231 | S | 12/1998 | Mumford |
| 6,170,188 | B1 | 1/2001 | Mathews |
| 6,206,747 | B1 | 3/2001 | Skwarek |
| 6,250,565 | B1 | 6/2001 | Ogie et al. |
| 6,360,474 | B1 | 3/2002 | Wurlitzer |
| D465,249 | S | 11/2002 | Weiser et al. |
| 6,475,056 | B1 | 11/2002 | Christianson |
| 6,484,431 | B1 | 11/2002 | Price et al. |
| D474,421 | S | 5/2003 | Weiser |
| 6,574,904 | B1 | 6/2003 | Fencel et al. |
| 6,599,160 | B1 | 7/2003 | Weiser et al. |
| 6,773,768 | B1 * | 8/2004 | Weiser ........................ 428/16 |
| 6,843,702 | B1 * | 1/2005 | Weiser ....................... 446/199 |
| 2003/0126774 | A1 | 7/2003 | Lim et al. |
| 2003/0166374 | A1 | 9/2003 | Nelson et al. |

* cited by examiner

SPRING NOVELTY WITH ROTATING APPENDAGE AND REMOVABLE SECURING PORTION

This application is a continuation of application Ser. No. 10/457,919 filed on 9 Jun. 2003, now U.S. Pat. No. 6,843,702.

COPYRIGHT AUTHORIZATION

A portion of the disclosure of this patent document contains material which is subject to copyright protection. The copyright owner has no objection to the facsimile reproduction by any one of the patent disclosure as it appears in the U.S. Patent and Trademark Office patent files or records, but otherwise reserves all copyright rights whatsoever.

BACKGROUND OF THE INVENTION

1. Field of the Invention

This invention relates to spring novelties of the type that may be placed or staked into a lawn or garden or used in a kitchen or other room in order to add aesthetic value thereto.

2. Description of the Related Art

Various novelties are known wherein the novelties represent various doll-like or whimsical figures wherein the appendages may have spring connections to the body. See, for example, U.S. Pat. No. 2,760,303 which is directed to ARTICULATED FIGURE TOY. In other instances a bird or the like having a body wherein the head is connected by a coil spring is shown in U.S. Des. Pat. No. 337,358 entitled LINKING BIRD.

While the various novelties that have been disclosed in the prior art utilize in some instances spring attachments for appendages, none of which Applicant is aware shows a wholly fanciful figure as, for example, a person, an animal, a bird or the like wherein each of the head and other appendages are connected to the body by reason of spring connectors having a K-factor that allow for easy movement of the attached components to the body, and further having a rotating member adjacent to the tail portion of the novelty.

In the case of a garden stake article none is known wherein at least one of the legs of the animal, bird or the like comprises a spring connector which terminates at a foot portion. Furthermore no novelty is known having removable double forked ends or single forked ends for easy staking in a garden and wherein the novelty is finished with an enamel of brightly colored paint to thereby simulate a whimsical caricature of an animal or the like. Additionally, the stake aspect may be terminated in a stand which supports the novelty.

With the hereindisclosed invention, a whimsical, aesthetically pleasing novelty is disclosed which adds visual beauty to any setting. Additionally, the novelties of the invention utilize components which are attached to a body simulating a vertebrate, animal, bird or the like wherein the attachment means in a specific embodiment is a coiled spring having a K-factor such that passage of wind or vibrations or the like will make for dynamic movement of the novelty in any setting, whether it be a garden or kitchen thereby adding to the enjoyment of the observer thereof.

SUMMARY OF THE INVENTION

The present invention is directed to a whimsical caricature wherein a body has associated therewith either wings, arms, head, tail and legs each of which are connected by means of a spring means or coil spring having a K-factor that is relatively and selectively chosen such that, depending upon the weight of the appendage being supported, the same may be easily moved through vibrational or other forces impacted thereon relative to the body with which it is associated, and further having a wind activated rotating member near, or as, an appendage.

While the invention may be described in specific detail with regard to a bird and cartoon-like article, it is not to be so narrowly construed inasmuch as the same inventive concept may be applied to humans, vertebrates, animals, insects, fish or the like, it only being important that the appendages of the simulated article be connected to a body by means of a spring connecting means which ideally, and in the preferred embodiment, takes the configuration of a coil spring. However, other spring configurations may be utilized just so long as the attributes of the disclosed invention are obtained.

With the herein disclosed invention, a novelty is obtained which the prior art does not teach, suggest or disclose and which provides for obtaining a whimsical, cartoon-like characterization or caricature of a vertebrate, animal, bird, fish, or the like.

OBJECTS OF THE INVENTION

It is an object of the present invention to provide a novelty which is whimsical in nature and aesthetically pleasing to view.

It is another object of the invention to provide a novelty which has movable elements for enhancing visual enjoyment of a varied setting.

It is still another important object of the invention to provide a whimsical caricature of a vertebrate, animal, bird or the like wherein the appendages and head of the vertebrate, animal, bird or the like are connected to the body thereof through a connecting means which provides for movement of the connected members relative to the body.

It is still another important and specific object of the invention to provide an ornamental novelty taking the form of a bird caricature wherein the head, wings, tail and legs of the bird are attached through a spring connector which provides for easy movement of the connected elements relative to the body. The ornamental novelty may also include a rotating member near the tail that rotates with relatively small forces acting upon it.

It is still another object of the invention to provide optionally removable stakes that extend parallel to the legs of the novelty for staking into a garden setting or the like.

These and other objects and advantages of the present invention will be apparent from a review of the following specification and accompanying drawings.

BRIEF DESCRIPTION OF THE DRAWINGS

FIGS. 4*a* and 4*b* are schematic representations showing alternative forms of removable forks for staking the novelty in FIG. 1 in a garden or the like.

DESCRIPTION OF THE PREFERRED EMBODIMENT(S)

Figure 1:
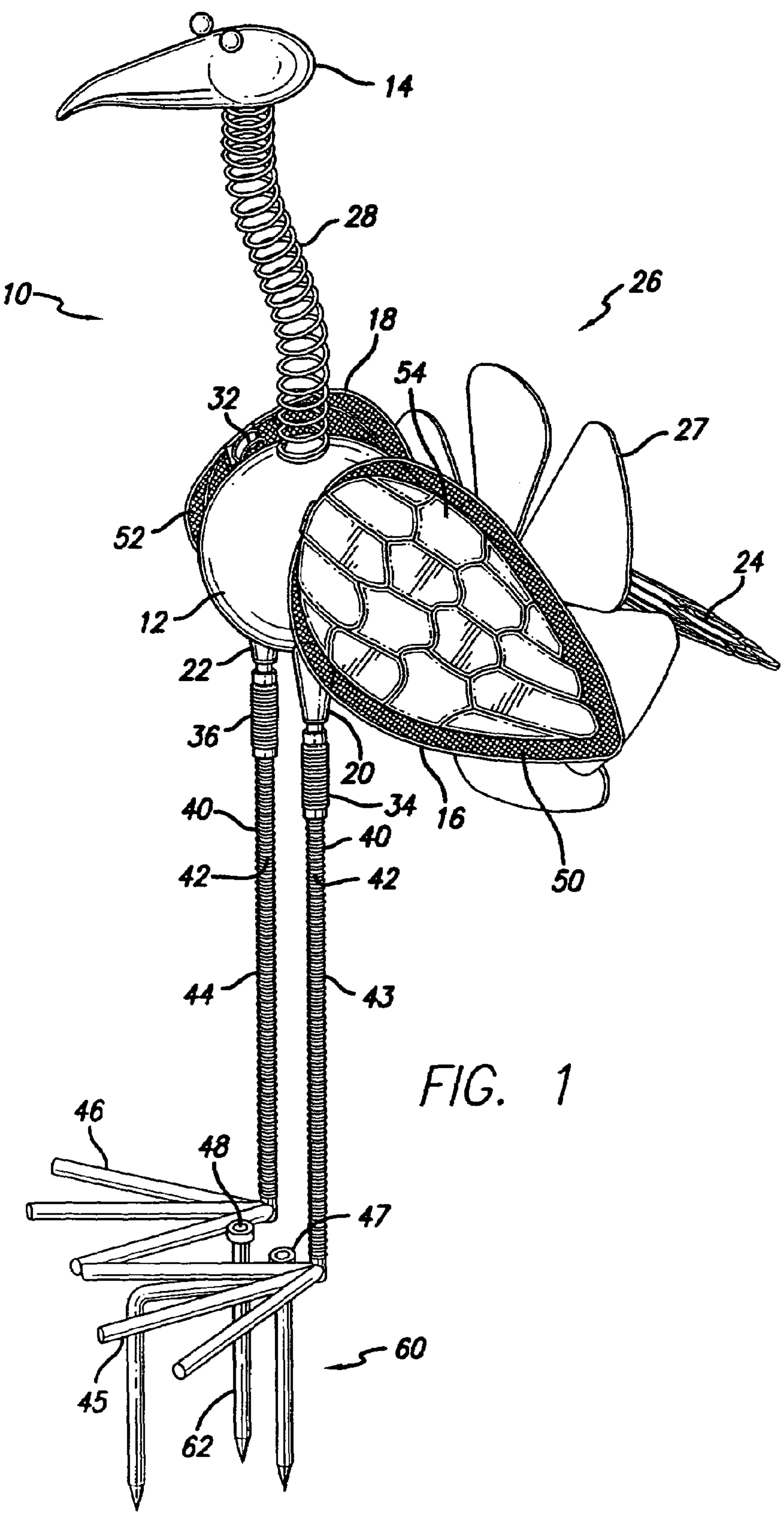
FIG. 1 is a perspective view of the inventive, decorative novelty of the invention as embodied in a whimsical bird.
Figure 2:
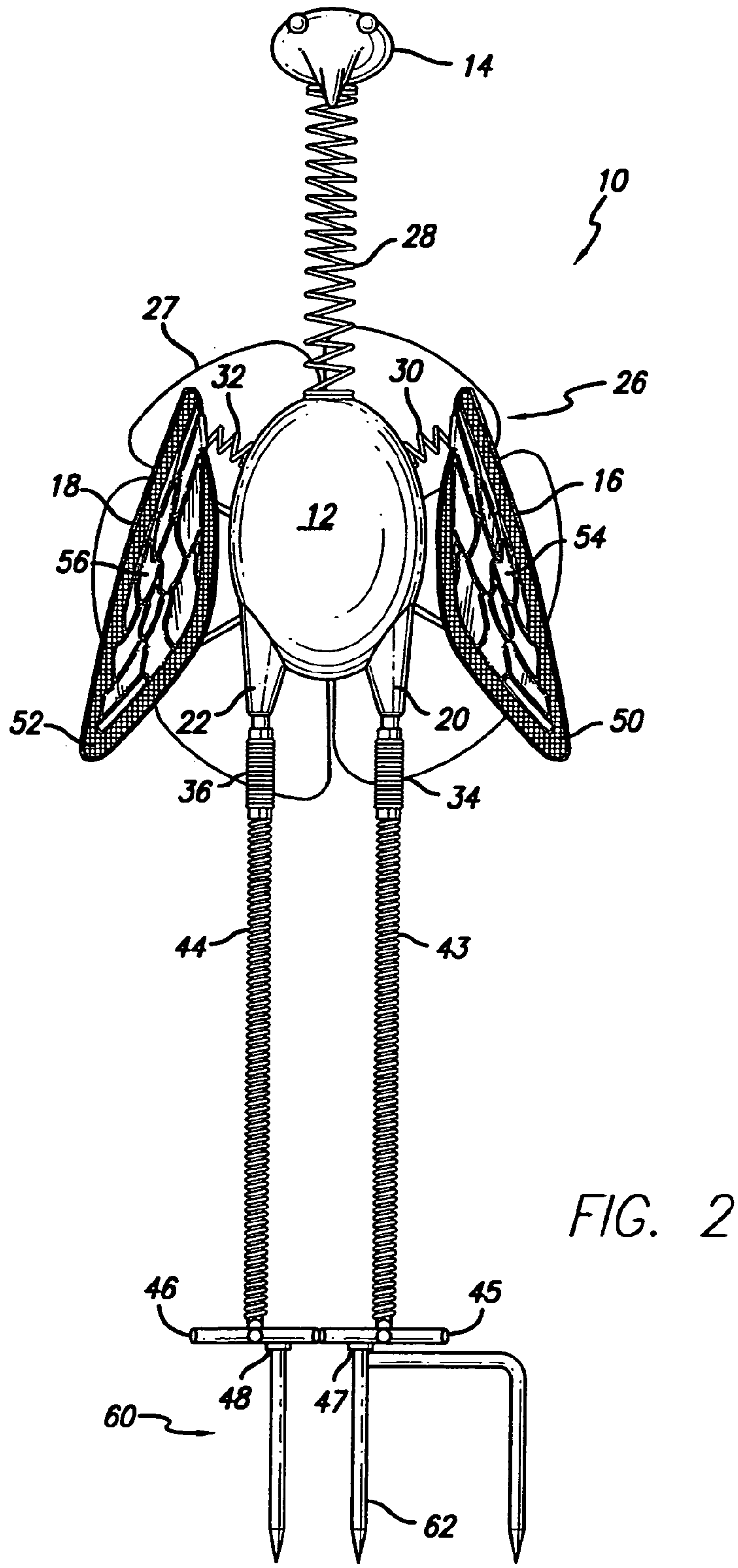
FIG. 2 is a front view of the novelty shown in FIG. 1 illustrating additional detail thereof.
Figure 3:
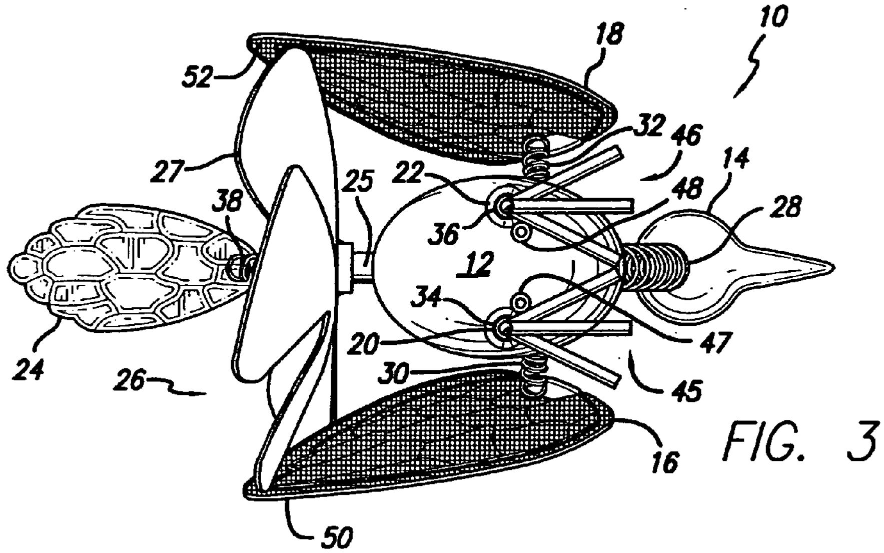
FIG. 3 is a bottom view of the novelty depicted in FIG. 1.

The detailed description set forth below in connection with the appended drawings is intended as a description of presently preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

The invention is directed to a novelty comprising the combination of a simulated vertebrate, animal, bird or the like having a head, a body, a tail and appendages, wherein the head, tail and appendages being operatively connected to the body through a spring connecting means wherein the K-factor of the spring connecting means is such as to allow each of the head and appendages to be easily movable through spring action relative to the body and to be freely and easily movable thereto. Optionally, a rotating member that rotates with relatively low forces acting upon it may be included. In the case of the embodiment of the invention being directed to a garden item, at least one removable stake element that extends from the base to secure the novelty in a garden or the like.

Referring to FIGS. 1–4 of the drawing wherein like members of reference designate like elements throughout, it will be seen that the novelty in this particular instance takes the form of an avian caricature and it will be seen that the novelty 10 as indicated takes the form of a bird having a body 12, a head 14 and wings 16 and 18, as well as legs 20 and 22, and tail 24, and wherein it will be noted that each of head 14, wings 16 and 18, legs 20 and 22 and tail 24 are associated with the body 12 by means of coupling members 28, 30, 32, 34, 36 and 38, respectively.

With respect to the coupling member 28, it will be seen that the same takes the form, in one embodiment, of a coil spring somewhat extensive in length and having a K-factor such that when the novelty 10 is staked or placed on its stand in the garden or the like, that vibrational movement of the ground or movement caused by the wind will impart dynamic action and movement of the head 14 relative to the body 12.

Likewise, the wings 16 and 18 being associated with the body 12 through coupling members 30 and 32 here again taking the form of coil springs but being shorter in length, but again having a K-factor that depending upon the weight of the wings 16 and 18 is such that vibrational movement either imparted through the novelty 10 from the ground or by means of a wind in the ambient atmosphere in which the novelty 10 is placed, will cause the wings to have some dynamic action or simulated flapping thereof.

Adjacent to tail 24 is a rotating member 26, which is configured to rotate when acted upon by very low forces. Rotating member 26 may be in the form of a fan as shown in FIG. 1 including blades 27. Rotating member 26 typically is coupled to body portion 12 via axle 25. Rotating member 26 typically rotates about axle 25, but other configurations may be utilized, as desired. It will be appreciated that rotating member 26, and axle 25 may be located at other locations of the novelty. Furthermore, rotating member 26 may be in forms other than a fan, as desired. Rotating member 26 is typically a 6-bladed fan, 3.0–6.0 inches in diameter, but other configurations and dimensions may be used, as desired.

Connected to the legs 20 and 22 are coupling members 34 and 36 in this particular instance taking the form of a coil spring of diameter larger than the depending leg extensions 43 and 44 terminating at base portions 45, and 46. Although base portions 45 and 46 are shown as having three toes and a thumb or spur, other numbers and configurations of toes, thumbs and spurs may be used, as desired.

Base portions 45 and 46 are configured to add stability to novelty 10, such that novelty 10 may remain upright. Although base portions 45 and 46 are shown resembling feet, it will be appreciated that other configurations may be used, as desired.

Figure 4A:
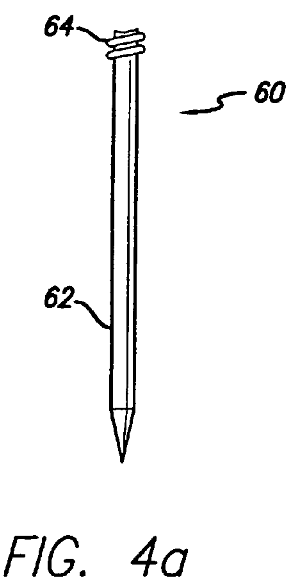
Figure 4B:
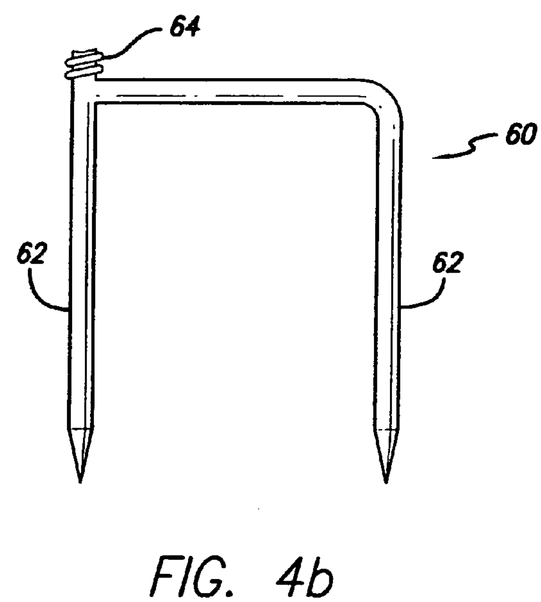

Also toward the ends of leg extensions 43 and 44 are apertures 47 and 48 coupled to base portions 45 and 46, respectively. Removable forks 60 are configured to connect to leg extensions 43 and 44 via apertures 47 and 48. As shown in FIG. 5*a*, removable fork 60 may have a single tine 62 or as shown in FIG. 4*b*, may have multiple tines 62. Although two tines are shown in the embodiment in FIG. 4*b*, it will be appreciated that any number of tines can be used, as needed or desired.

Removable forks 60 typically have a connection portion 64 that is threaded and configured to rotate into apertures 47 and 48, which may also be threaded. However, it will be appreciated that other connection configurations can be utilized, including gluing or configured as an interference fit. Furthermore, although apertures 47 and 48 are shown toward the inside of base portions 45 and 46, they may be in other locations toward the ends of leg extensions 43 and 44, or base portions 45 and 46.

The leg extensions 43 and 44 which are welded, soldered or otherwise connected to legs 20 and 22 are composed of rods 40 about which a coupling member 42 is wrapped thereabout and the only movement that is obtained to the novelty 10 through the leg extensions 43 and 44 is obtained through the intermediate coupling members 34 and 36 respectively, which hereagain are configured in the form of coil springs again having a K-factor depending upon the weight being supported thereby being selected such that the dynamic movement of the novelty 10 is obtained. Operable connections, as those of ordinary skill in the art will recognize, may take the form of mechanical connections or weld and/or solder joining, among others.

In the embodiment depicted, the novelty 10, and more specifically the wings 16 and 18, are fabricated of a wire mesh 50 and 52, respectively, and have overlaid thereon a thin, metal enameled representation of feather plates 54 and 56 respectively. These metal plates 54 and 56 are as indicated, configured, and as shown as to simulate feathers and may be of various colors and may be chosen to be whimsical in nature and preferably are of a high lacquer finish or other long-lasting finishes so that the same will withstand the ambient elements as well as be reflective and pleasing to look at. The same may be said for the exterior finish of the remainder of the novelty 10 with the colors for the head and legs, etc. being selected as a matter of choice, the same being chosen so as to make the novelty 10 as attractive to the eye as possible depending upon the end result to be obtained.

While the invention has been described with respect to a simulated bird, those of ordinary skill in the art will recognize that the same principles may be applied to other animals, fish, insects, vertebrates and the like wherein it is desired to have a whimsical, dynamically active novelty for garden, kitchen or the like, it only being important that the head and appendages, whether they be arms, wings or legs or the like, be connected to a body through a spring connecting means which allows for easy movement of the spring supported members or appendages.

Additionally, with respect to the embodiments of FIGS. 1–5, while a dual support means has been shown, it is within the comprehension of the invention that a singular stake be used which would take the place of either one of the leg extensions 43 or 44 such that a single rod can be used to support the animal, bird or the like. Also, while the invention has been described with respect to a specific construction of elements and finishes those of ordinary skill in the art will of course recognize that these are mere matter of choice selections and that other finishes, etc., may be utilized.

Further, those of ordinary skill in the art will recognize that the spring connectors, their K-factors, weight and size will be dictated by the appendage or body it is intended to support and still achieve the movement of the novelty desired.

Thus there has been disclosed a whimsical novelty article taking the form of a whimsical vertebrate, bird, animal or the like that will add dynamic pleasure to any setting whether it be a garden, kitchen or other setting.

What is claimed is:

1. An animate figurine novelty comprising:

a head;

a body representing a torso of the animate figurine;

a tail;

at least one leg extending from said body;

at least one rotating member extending radially outward from an axle projecting rearward from said body to be disposed between said body and said tail; and a plurality of appendage members;

each of said head and appendage members being coupled to said body through a coupling member wherein the coupling member includes an elastic portion having a K-factor sufficient to allow each of said head and appendage members to be movable through a spring action relative to said body.

2. The novelty in accordance with claim 1, further including a removable fork coupled to said novelty.

3. The novelty in accordance with claim 2, wherein said removable fork comprises a tine.

4. The novelty of claim 1, wherein said rotating member rotates about said axle.

5. The novelty in accordance with claim 1, wherein said novelty takes the configuration of a bird.

6. The novelty in accordance with claim 5, wherein said bird is a fanciful caricature.

7. The novelty in accordance with claim 1, wherein said coupling member comprises a coil spring.

8. The novelty in accordance with claim 1, wherein said tail is joined to said rotating member by a coupling member extending therebetween, said coupling member including a coil spring.

9. A novelty comprising:

a head;

a body;

at least one support extending from said body, simulating a leg of a vertebrate, animal, bird, whimsical figure, or caricature;

at least one rotating member extending radially outward from an axis defined by said body; and a plurality of appendage members;

each of said head and appendage members being coupled to said body through a coupling member wherein the coupling member includes an elastic portion having a K-factor sufficient to allow each of said head and appendage members to be movable through a spring action relative to said body;

wherein said at least one support includes a rod element having a coiled spiral disposed thereabout.

10. A novelty comprising:

a head;

a body;

at least one support extending from said body, simulating a leg of a vertebrate, animal, bird, whimsical figure, or caricature;

at least one rotating member extending radially outward from an axis defined by said body; and a plurality of appendage members;

each of said head and appendage members being coupled to said body through a coupling member wherein the coupling member includes an elastic portion having a K-factor sufficient to allow each of said head and appendage members to be movable through a spring action relative to said body;

wherein said support includes at least one extension member movably coupled to said body, said extension member including a rod and a coil spring wrapped thereabout.

11. An animate figurine novelty comprising:

a body representing a torso of the animate figurine;

a head;

a tail;

at least one rotating member coupled to said body, said rotating member extending radially outward from an axle projecting rearward from said body to be disposed between said body and said tail; and a plurality of appendage members;

wherein said appendage members and said head are coupled to said body via coupling members, said coupling members each including an elastic portion having a K-factor sufficient to allow each of said head and appendage members to be movable through a spring action relative to said body.

12. The novelty of claim 11, further comprising a leg extending away from said body portion.

13. The novelty of claim 12, further comprising at least one base portion adjacent to said leg.

14. The novelty of claim 13, wherein said base portion comprises an aperture.

15. The novelty of claim 14, further comprising a removable fork configured to couple to said base portion.

16. The novelty of claim 15, wherein said removable fork includes:

at least one tine; and a connection portion configured for coupling to said aperture.

17. The novelty of claim 11, wherein said coupling members are coil springs.

18. An animate figurine novelty comprising:

a body representing a torso of the animate figurine;

a head coupled to said body;

a tail;

a plurality of appendage members coupled to said body;

a plurality of coupling members coupling said head and appendage members to said body, said coupling members each including an elastic portion having a K-factor sufficient to allow said one of said head and appendage members to be movable through a spring action relative to said body; and at least one of said appendage members representing a wing of the animate figurine;

a rotating member extending radially outward from an axle projecting rearward from said body to be disposed between said body and said tail.

19. The novelty of claim 18, further comprising a removable fork configured to couple to one of said appendage members.

* * * * *